(12) United States Patent
Chang

(10) Patent No.: US 7,126,459 B2
(45) Date of Patent: Oct. 24, 2006

(54) WARNING DEVICE FOR BICYCLE

(75) Inventor: Cliff Chang, Taipei Hsien (TW)

(73) Assignee: Everlive Technologies, Co., Ltd., Taipei Hsien (TW)

( * ) Notice: Subject to any disclaimer, the term of this patent is extended or adjusted under 35 U.S.C. 154(b) by 184 days.

(21) Appl. No.: 10/960,976

(22) Filed: Oct. 12, 2004

(65) Prior Publication Data

US 2006/0082449 A1   Apr. 20, 2006

(51) Int. Cl.
*B62J 3/00* (2006.01)

(52) U.S. Cl. ............... 340/432; 340/435; 340/438; 340/475; 340/461; 340/525; 362/208; 362/473; 362/500; 362/800

(58) Field of Classification Search ........... 340/432, 340/435, 438, 475, 525, 461; 362/208, 473, 362/500, 800
See application file for complete search history.

(56) References Cited

U.S. PATENT DOCUMENTS

| | | |
|---|---|---|
| 3,792,307 A | 2/1974 | Baker |
| 3,802,292 A | 4/1974 | Haberkorn et al. |
| 4,191,988 A | 3/1980 | Kumakura |
| 4,298,910 A | 11/1981 | Price |
| 2004/0036585 A1* | 2/2004 | Kitamura et al. ........... 340/432 |

* cited by examiner

*Primary Examiner*—Tai T. Nguyen
(74) *Attorney, Agent, or Firm*—Birch, Stewart, Kolasch & Birch, LLP

(57) ABSTRACT

A warning device for bicycle mainly includes a magnetic and a coil mechanism. The magnetic mechanism includes a magnetic element assembly, a mounting module, and a holding module movably connected to the mounting module for holding the magnetic element assembly therein. The coil mechanism includes a housing, a coil assembly, a rectifier unit, a plurality of light-emitting elements, and a connecting module. The coil assembly, the rectifier unit, and the light-emitting elements are electrically connected to one another and then received in the housing. The mounting module of the magnetic mechanism is fixedly mounted on a fixed part of a bicycle close to a wheel thereof, and the connecting module of the coil module is fixedly connected to two spokes of the wheel, such that the magnetic element assembly and the coil assembly are located at corresponding radial positions relative to the wheel.

11 Claims, 7 Drawing Sheets

WARNING DEVICE FOR BICYCLE

FIELD OF THE INVENTION

The present invention relates to a warning device for bicycle, and more particularly to a warning device for bicycle including a coil assembly that is induced by a magnetic element assembly to produce induction current for light-emitting elements to emit warning light.

BACKGROUND OF THE INVENTION

The currently available bicycles are designed for pedaling with less effort, carrying about conveniently, and occupying less space to meet the demands in exercise and leisure activities, and are therefore particularly welcome by office workers who are too busy to have no time to take exercise. However, it is not safe to ride a bicycle in the night or at a dark place. Thus, there have been developed light-emitting elements or reflective units as a warning device for bicycles to reduce accidents while beautify the bicycles.

Taiwanese invention patent application No. 092214918 entitled "Warning Device for Bicycle" filed by the same applicant on Aug. 18, 2003 discloses a warning device that includes a fixed mechanism (11) with magnets (12) being fixedly mounted on a bicycle frame (22), and a fixing plate (13) fixedly mounted on a wheel rim (21). A coil (14) is screwed to the fixing plate (13) using screwing elements (16) made of a soft steel material. When the wheel rim (21) rotates, the coil (14) is brought to pass the magnets (12) and electromagnetically induced to produce induction current for driving light-emitting elements (18) to emit light.

In brief, the warning device for bicycle disclosed in the above-mentioned Taiwanese invention patent application utilizes the electromagnetic induction of the coil on the fixing plate (13) mounted on the rotating wheel rim by the magnets (12) of the fixed mechanism (11) fixedly mounted on the bicycle frame (22) to produce induced current for driving light-emitting elements (18).

Although the above-structured warning device for bicycle provides good warning function and could be easily assembled to and disassembled from the bicycle to attract consumers and enable reduced packing and transporting costs, it is still desired to develop a further improved warning device for bicycle.

SUMMARY OF THE INVENTION

A primary object of the present invention is to provide a warning device for bicycle that utilizes electromagnetic induction to produce induced current for light-emitting elements to emit warning light from a bicycle.

Another object of the present invention is to provide a warning device for bicycle that could be conveniently mounted to and dismounted from a bicycle.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention relates to a warning device for bicycle and mainly includes a magnetic mechanism 11 and a coil mechanism 12.

Figure 1:
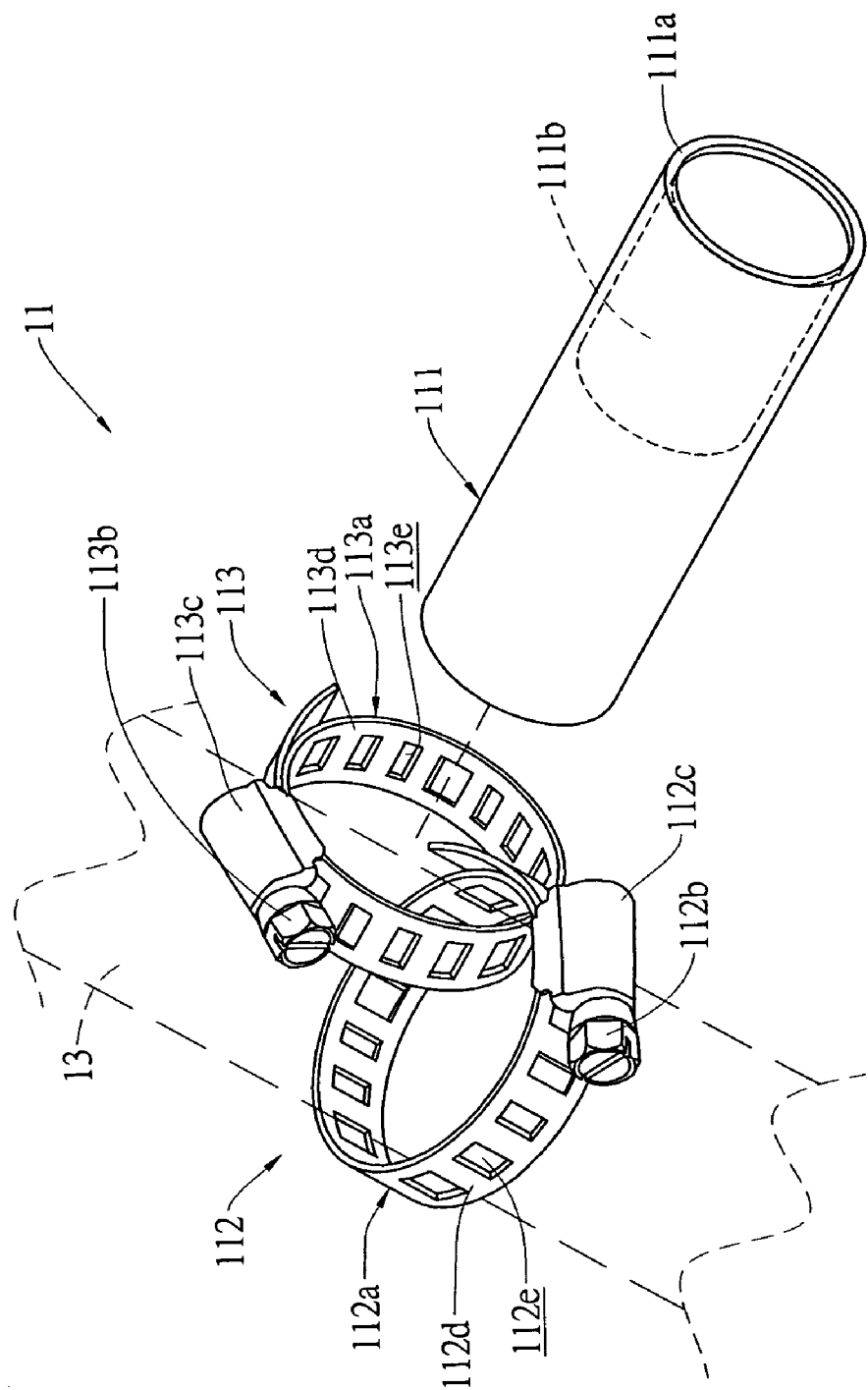
FIG. 1 is an exploded perspective view of a magnetic mechanism in a preferred embodiment of the present invention.
Figure 2:
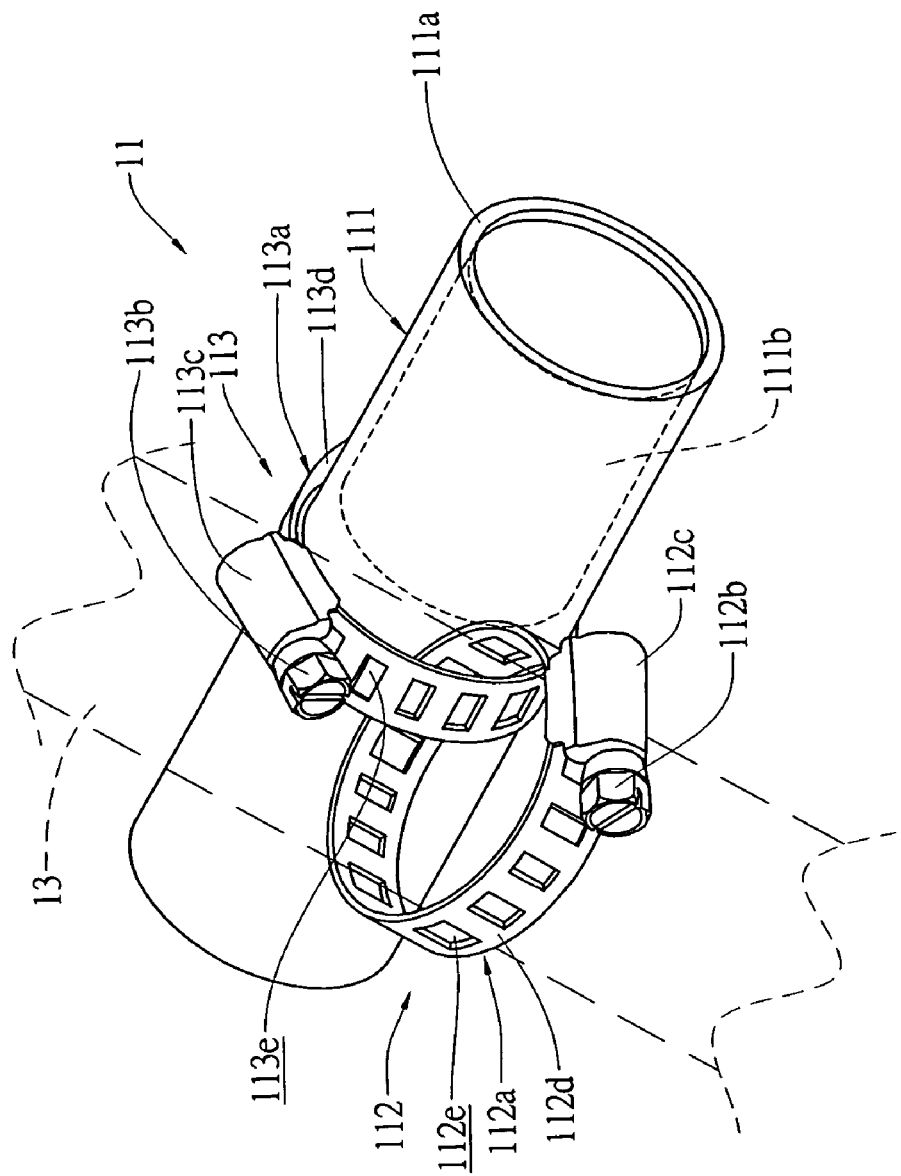
FIG. 2 is an assembled view of FIG. 1.

Please refer to FIGS. 1 and 2 that are exploded and assembled perspective views, respectively, of the magnetic mechanism 11 in the present invention. As shown, the magnetic mechanism 11 includes a magnetic element assembly 111, a mounting module 112, and a holding module 113. The magnetic element assembly 111 is held in the holding module 113 while the latter is movably connected to the mounting module 112. The magnetic element assembly 111 consists of a sleeve 111a, and a magnetic element 111b located in the sleeve 111a. The mounting module 112 consists of a mounting ring 112a, and a fastening element 112b connected to the mounting ring 112a. The mounting ring 112a includes a ring body 112d and a locating element 112c movably connected to the ring body 112d. The holding module 113 consists of a holding ring 113a, and a fastening element 113b connected to the holding ring 113a. The holding ring 113a includes a ring body 113d and a locating element 113c movably connected to the ring body 113d.

Figure 3:
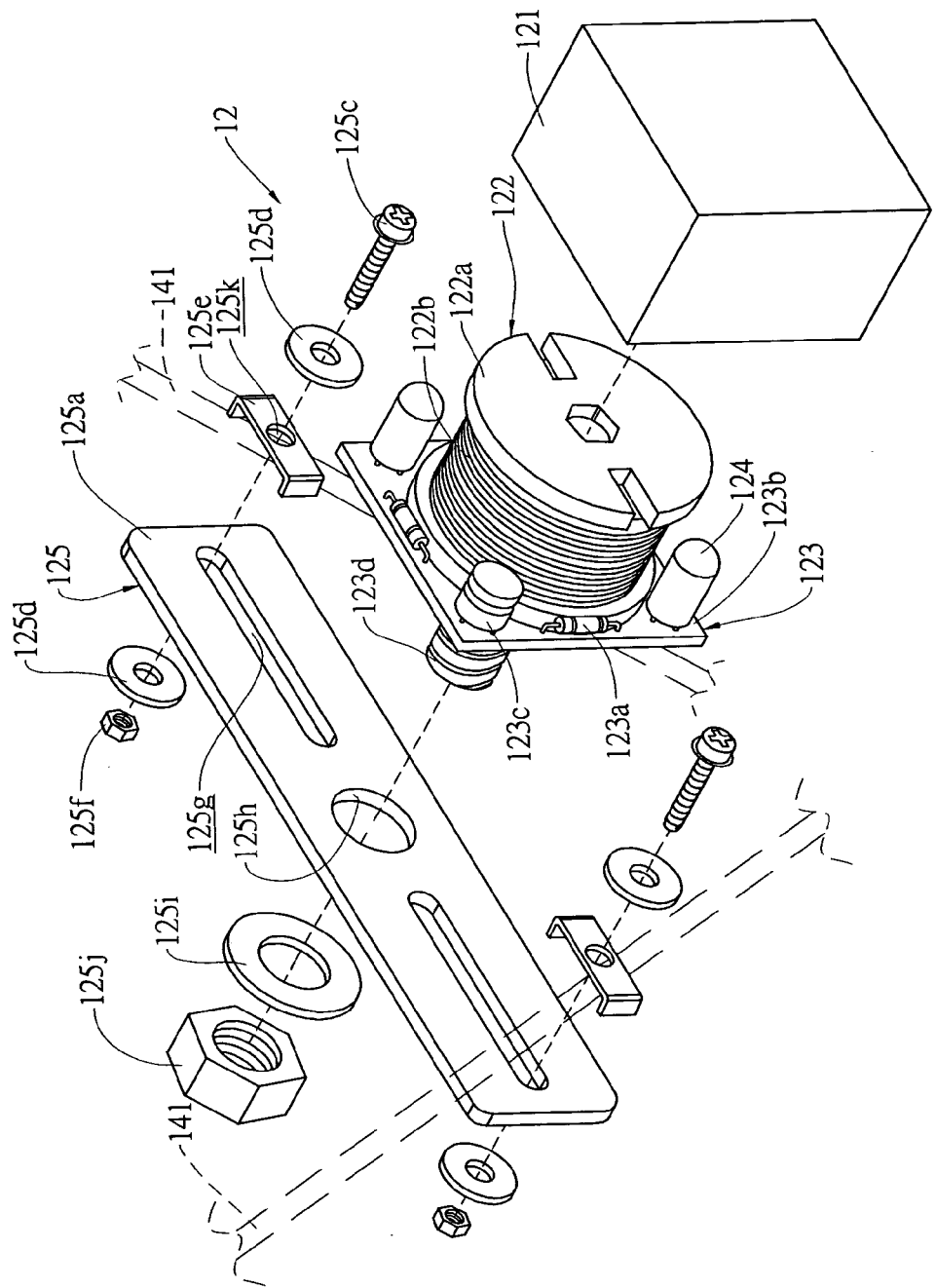
FIG. 3 is an exploded perspective view of a coil mechanism in the preferred embodiment of the present invention.
Figure 4:
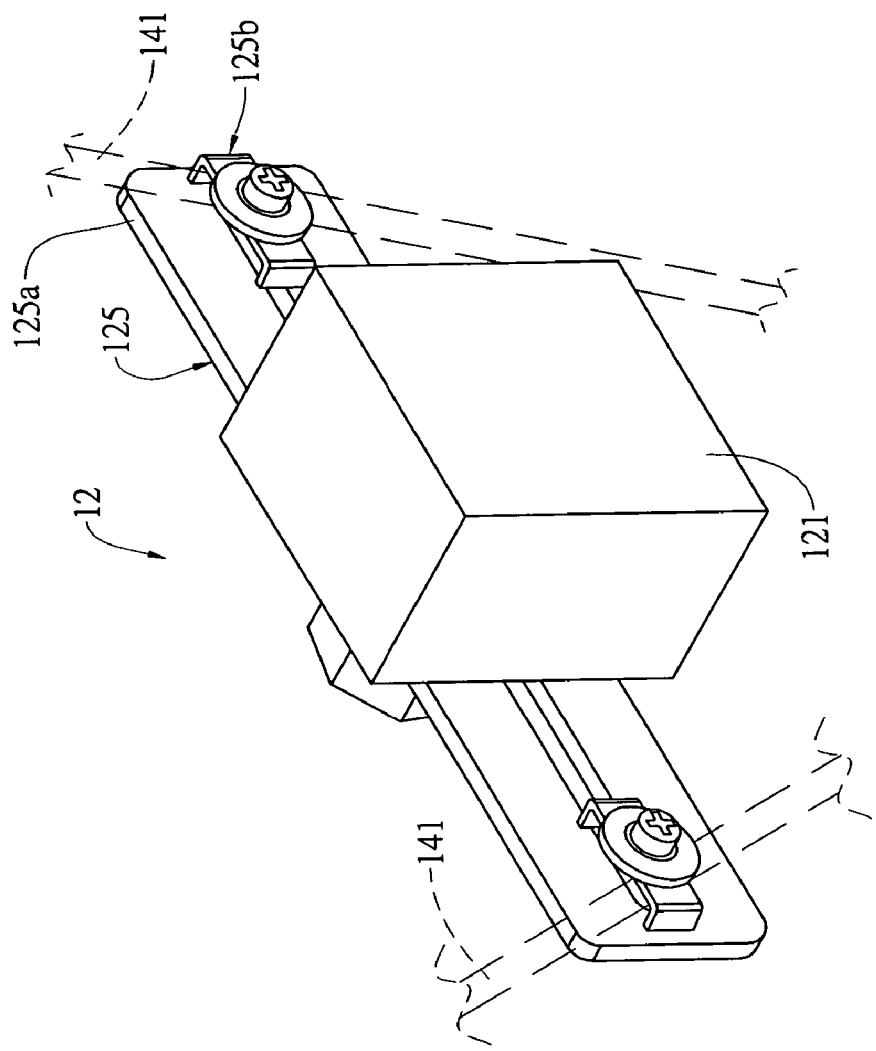
FIG. 4 is an assembled view of FIG. 3.
Figure 5:
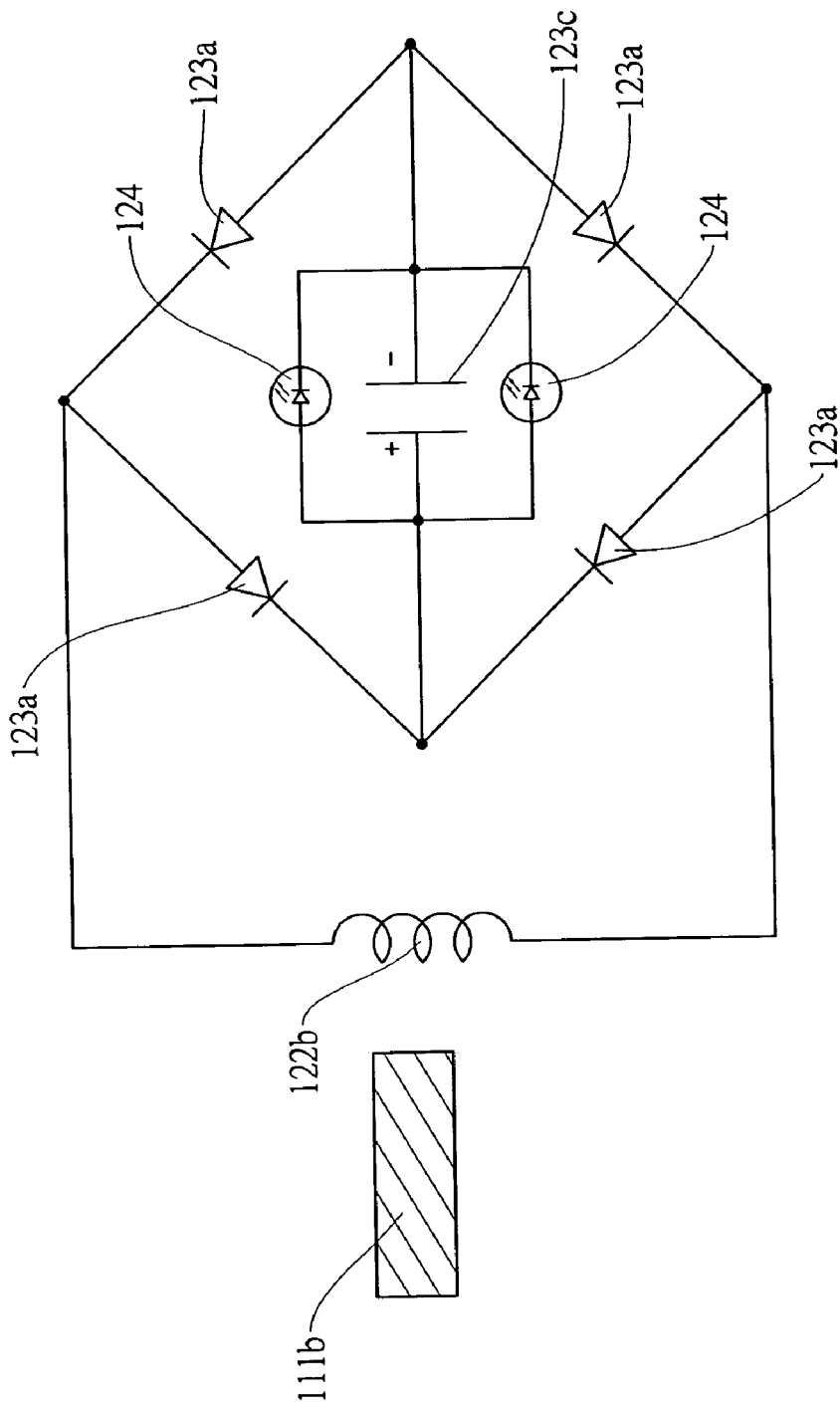
FIG. 5 is a circuit diagram of a coil assembly, a rectifier unit, and light-emitting elements included in the present invention.
Figure 6:
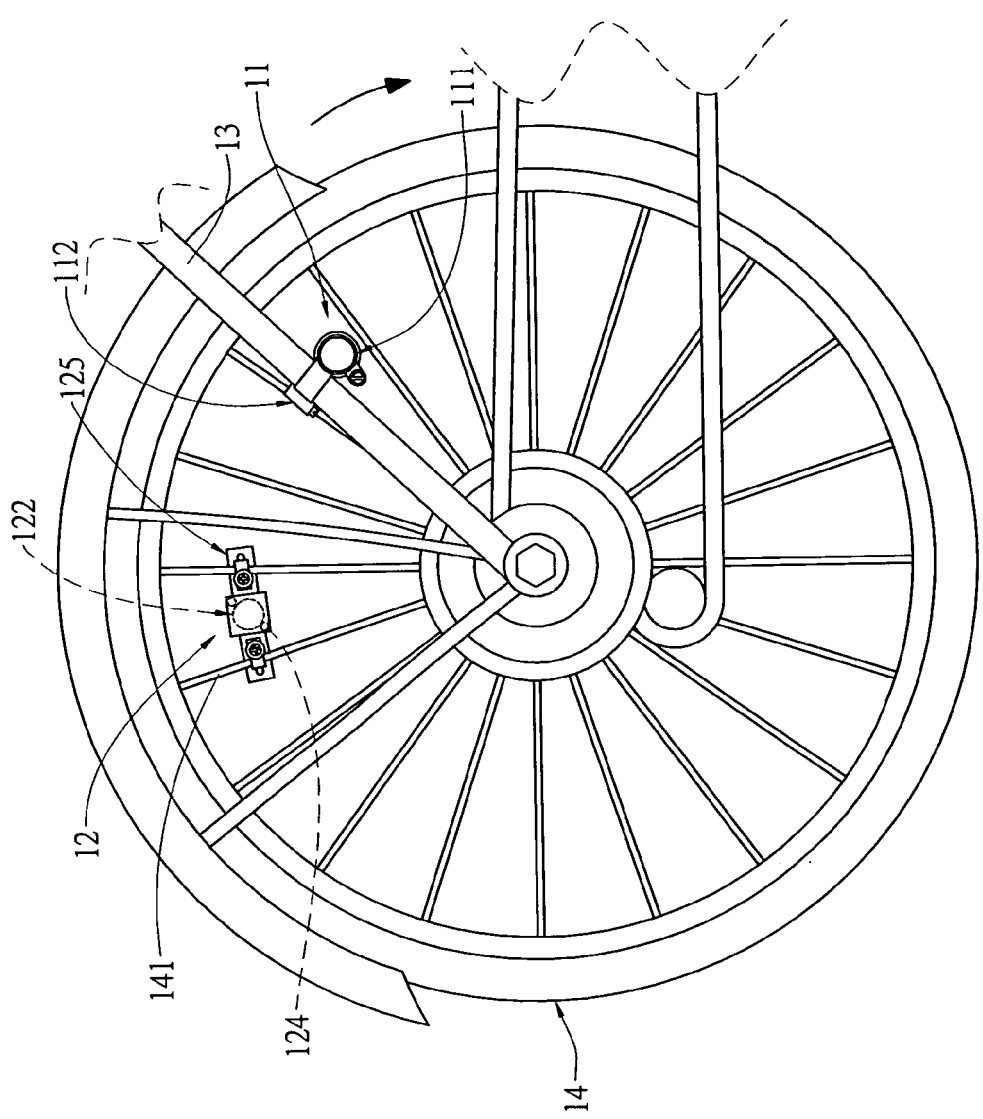
FIG. 6 shows the coil mechanism of the present invention mounted on a rotating wheel before being moved to pass the magnetic mechanism.
Figure 7:
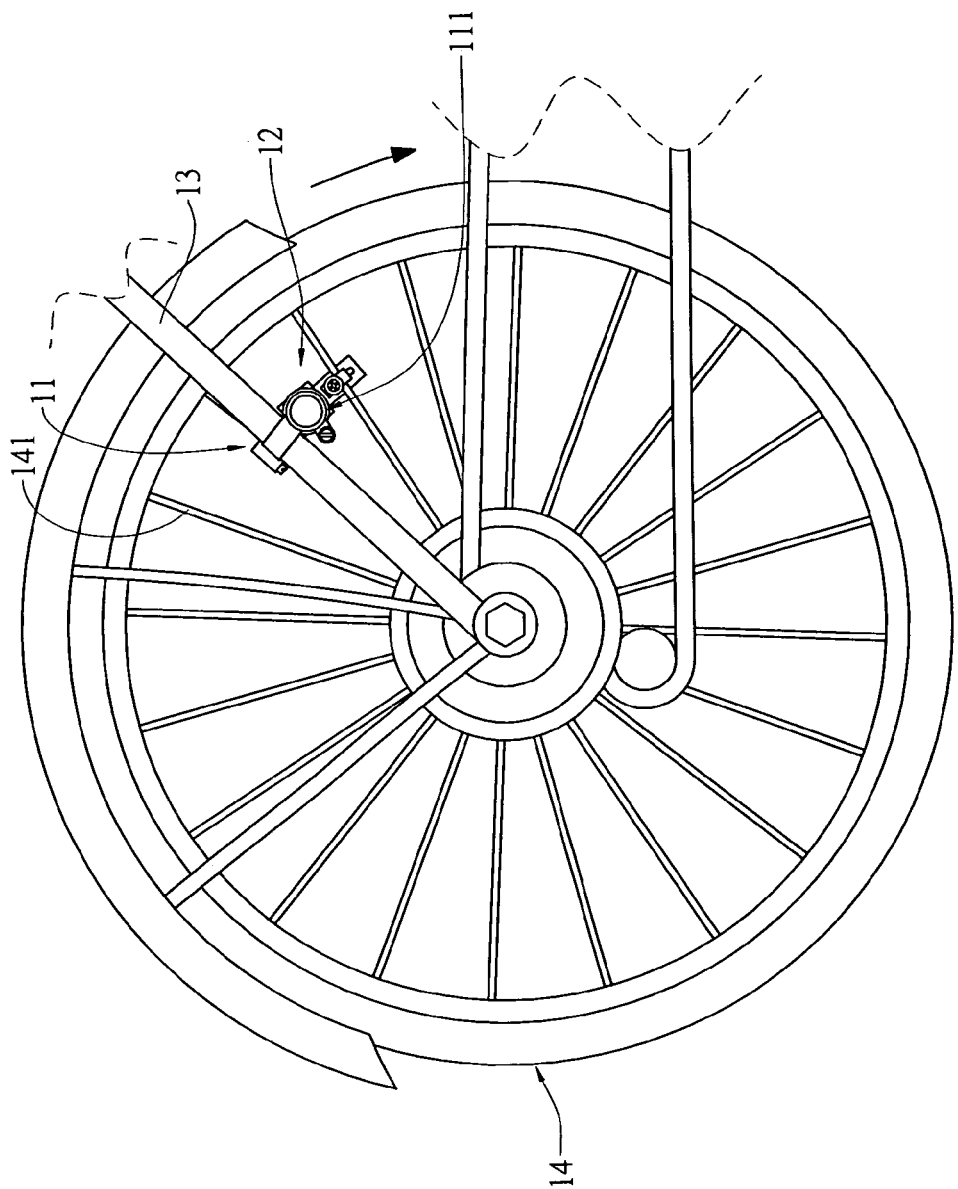
FIG. 7 shows the coil mechanism on the rotating wheel being moved to pass the magnetic mechanism.

FIGS. 3 and 4 are exploded and assembled perspective views, respectively, of the coil mechanism 12 in the present invention. As shown, the coil mechanism 12 includes a housing 121, a coil assembly 122, a rectifier unit 123, a plurality of light-emitting elements 124, and a connecting module 125. The coil assembly 122, the rectifier unit 123, and the light-emitting elements 124 are electrically connected to one another and then received in the housing 121. The coil assembly 122 includes a coil holder 122a and a coil 122b wound around the coil holder 122a. The rectifier unit 123 consists of a plurality of bridge rectifiers 123a, a circuit board 123b, on which the bridge rectifiers 123a are mounted, and a capacitor 123c mounted on the circuit board 123b. The bridge rectifiers 123a are made of germanium (Ge) and electrically connected to and between the coil 122b and the light-emitting elements 124, as shown in FIG. 5, so as to rectify current and reduce current consumption while intensify a brightness of the light-emitting elements 124. The light-emitting elements 124 are mounted on the circuit board 123b. The connecting module 125 consists of a plate 125a and two sets of locking components 125b assembled to the plate 125a. Each of the two sets of locking components 125b includes a fastening element 125c, a plurality of washers 125d, a holding bracket 125e, and a nut 125f for screwing onto the fastening element 125c.

To assemble the present invention, first tighten the fastening elements 112b and 113b against the locating elements 112c and 113c, respectively, with the fastening elements 112b and 113b engaged with holes 112e and 113e on the ring bodies 112d and 113d, respectively, so that the mounting ring 112a of the mounting module 112 is fixedly mounted on a fixed part 13, such as a seat stay, close to a wheel 14 of a bicycle. Then, connect the holding ring 113*a* of the holding module 113 to the ring body 112*d* of the mounting ring 112*a*, and hold the sleeve 111*a* having the magnetic element 111*b* located therein in the ring body 113*d* of the holding ring 113*a*.

Thereafter, extend a screw bolt 123*d* fixedly provided on the circuit board 123*b* through a round through hole 125*h* on the plate 125*a* and a washer 125*i* to engage with a nut 125*j*. Then, separately extend the fastening element 125*c* in each set of locking components 125*b* through two washers 125*d*, a through hole 125*k* on the holding bracket 125*e*, and a narrow long hole 125*g* on the plate 125*a* to tightly engage with the nut 125*f*, with the holding bracket 125*e* fixedly straddled a spoke 141 of the wheel 14. Finally, connect the housing 121 to the circuit board 123*b*.

As can be seen from FIGS. 1 to 4, 6, and 7, when the mounting module 112 of the magnetic mechanism 11 and the connecting module 125 of the coil mechanism 12 are fixedly mounted on the seat stay 13 and the spoke 141 of the wheel 14, respectively, with the magnetic element 111*b* and the coil assembly 122 located at corresponding radial positions relative to the wheel 14, the coil assembly 122 is electromagnetically induced by the magnetic element 111*b* to produce induction current for the light-emitting elements 124 to emit warning light when the coil assembly 122 on the spoke 141 is moved by the rotating wheel 14 to pass the magnetic element 111*b* fixedly mounted on the seat stay 13.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A warning device for bicycle, comprising a magnetic and a coil mechanism;
    said magnetic mechanism including a magnetic element assembly, a mounting module, and a holding module;
    said magnetic element assembly being held in the holding module, and said holding module being movably connected to said mounting module;
    said coil mechanism including a housing, a coil assembly, a rectifier unit, a plurality of light-emitting elements, and a connecting module;
    said coil assembly, said rectifier unit, and said light-emitting elements being electrically connected to one another and then received in said housing;
    said mounting module of said magnetic mechanism being fixedly mounted on a fixed part of a bicycle close to a wheel thereof, and said connecting module of said coil mechanism being fixedly connected to two spokes of said wheel, such that said magnetic element assembly and said coil assembly are located at corresponding radial positions relative to said wheel;
    whereby when said wheel rotates to move said coil assembly to pass said magnetic element assembly, said coil assembly is electromagnetically induced to produce induction current for said light-emitting elements to emit warning light.

2. The warning device for bicycle as claimed in claim 1, wherein said magnetic element assembly includes a sleeve and a magnetic element located in said sleeve.

3. The warning device for bicycle as claimed in claim 1, wherein said mounting module includes a mounting ring and a fastening element connected to said mounting ring.

4. The warning device for bicycle as claimed in claim 3, wherein said mounting ring includes a ring body and a locating element movably connected to said ring body.

5. The warning device for bicycle as claimed in claim 1, wherein said holding module includes a holding ring and a fastening element connected to said holding ring.

6. The warning device for bicycle as claimed in claim 5, wherein said holding ring includes a ring body and a locating element movably connected to said ring body.

7. The warning device for bicycle as claimed in claim 1, wherein said coil assembly includes a coil holder and a coil wound around said coil holder.

8. The warning device for bicycle as claimed in claim 1, wherein said rectifier unit includes a bridge rectifier and a circuit board, on which said rectifier is mounted.

9. The warning device for bicycle as claimed in claim 8, wherein said circuit board has a capacitor mounted thereon.

10. The warning device for bicycle as claimed in claim 1, wherein said connecting module includes a plate and two sets of locking components assembled to said plate.

11. The warning device for bicycle as claimed in claim 10, wherein each set of said locking components includes a fastening element, a plurality of washers, a holding bracket, and a nut for engaging with said fastening element.

* * * * *